UNITED STATES PATENT OFFICE.

LOUIS E. BARTON, OF NIAGARA FALLS, NEW YORK, ASSIGNOR TO THE TITANIUM ALLOY MANUFACTURING COMPANY, OF NEW YORK, N. Y., A CORPORATION OF MAINE.

METHOD OF OBTAINING TITANIC OXID.

1,206,797.   Specification of Letters Patent.   Patented Dec. 5, 1916.

No Drawing.   Application filed March 7, 1916.   Serial No. 82,559.

*To all whom it may concern:*

Be it known that I, LOUIS E. BARTON, a citizen of the United States, and a resident of Niagara Falls, in the county of Niagara and State of New York, have invented certain new and useful Improvements in Methods of Obtaining Titanic Oxid, of which the following is a specification.

My present invention relates to the obtaining of titanic oxid concentrates from titaniferous and ferruginous substances, such, for example, as ilmenite ores, and more particularly to such methods for so doing as are disclosed in Letters Patent granted to Auguste J. Rossi and myself, Nos. 1,106,409 and 1,106,410, dated August 11, 1914, and No. 1,171,542, dated February 15, 1916.

The objects of my present invention comprise provision of novel steps in the practice of such, or similar methods whereby their final products are attainable more readily, safely, and economically, and of more desirable quality for certain purposes.

Reference to the said Letters Patent will disclose the methods, processes, and products therein described and claimed, the which may, for the purposes of this specification, be summarized as follows, viz: The titaniferous-ferruginous substances treated, such, for example, as ordinary titaniferous, or ilmenite, ores, were melted in the presence of sulfid of an alkali metal, either charged as such, or produced by reactions in the charge, during its melting, from therewith-mixed carbonaceous material and sulfate of an alkali metal. The resulting melts were then preferably after, or without, lixiviation with water, heated in a bath containing sulfuric or hydrochloric acid so dilute as to dissolve the therein iron, and other, compounds, rather than those of titanium; and, finally, the insoluble residues being withdrawn, were washed, dried, and if desired, calcined, the resulting, usually powdered, products being prior to calcination, darkish to light gray in color, or, if calcined, yellowish, and distinguished, by analysis, as consisting principally of titanic oxid, the percentage of which was somewhat increased by calcination, and as containing also some soda and sulfuric anhydrid, and a relatively small quantity of iron oxid; one of the most notable and useful distinguishing characteristics of said products being the exceptional ease, rapidity, and completeness with which they are soluble in concentrated sulfuric, or other, acid. My present invention is based on my discovery that sulfurous acid may, with great advantage, be substituted for sulfuric, or hydrochloric, acid in the practice of said processes. When the sulfids produced in the melt of said patented processes, or in the sintered products of my analogous process for which I am applying for Letters Patent contemporaneously herewith, are treated as aforesaid with sulfuric or hydrochloric acids, a chemical equivalent of hydrogen sulfid gas is evolved. For example, with iron sulfid, we have:

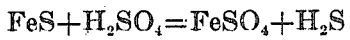

$$FeS + H_2SO_4 = FeSO_4 + H_2S$$

The well known character and effects of hydrogen sulfid indicate the necessity of operating in gas-tight apparatus, which is cumbrous and expensive, but which is advantageously dispensed with by my invention, the equation indicating the reaction when sulfurous acid is thus substituted for sulfuric, or hydrochloric, acid, being:

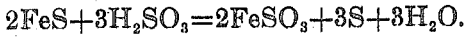

$$2FeS + 3H_2SO_3 = 2FeSO_3 + 3S + 3H_2O.$$

It follows that the aforesaid sulfid melts, or sintered products, can be safely treated in comparatively cheap open wooden tanks.

The sulfurous acid may, by my present method, be introduced as such in required quantity into the bath in which the aforesaid sulfid melts, or sintered products, are either heated, as per the above referred to methods of obtaining titanic oxid, or not heated which is one of the advantageous results of my use of sulfurous acid; or it may be produced in the bath by injection thereinto of sulfur dioxid gas, for example, of the quality containing considerable free oxygen and nitrogen, which is obtained from a pyrite burner, and thus the sulfurous acid advantageously utilized as soon as formed; or the sulfur dioxid may combine directly with the sodium and iron sulfids present. In either case the free oxygen contained in such more or less impure sulfur dioxid gas, has no appreciable undesirable oxidizing effect upon the charge.

Other economies resulting from my invention will be apparent to those skilled in the art, as, for instance, the cheapness of sulfur dioxid as compared to sulfuric acid, the former being a product of the first step in production of the latter, and the cost of subsequent steps being consequently avoided.

As appears from the last above stated equation, free sulfur is produced, but though the actual yield thereof is less than the theoretical indicated by the equation owing to other reactions resulting in soluble sulfur compounds, it is sufficient to constitute a valuable by-product of my process. This sulfur may be recovered by burning it out of my crude titanic oxid product, the resulting sulfur dioxid gas being then directly used as such, or if preferred, absorbed in water to form a solution of sulfurous acid utilizable in subsequent operations of my process. After the said treatment to the sulfurous-acid-containing-bath, the resulting titanic oxid product therefrom separated, as by filtration, is, as usual, washed, dried, or, if desired, also calcined.

What I claim as new and desire to secure by Letters Patent is the following:

1. The method of obtaining titantic oxid from a substance containing it and iron oxid, which comprises heating said substance in presence of sulfid of an alkali metal until formation of iron sulfid or ferro-sodium sulfid and treating the resulting product in a bath containing sulfurous acid so diluted as to dissolve therein iron compounds rather than those of titanium.

2. The method of obtaining titanic oxid from a substance containing it and iron oxid, which comprises heating said substance in presence of an oxid reducing agent and sulfate of an alkali metal until formation of iron sulfid or ferro-sodium sulfid and treating the resulting product in a bath containing sulfurous acid so diluted as to dissolve therein iron compounds rather than those of titanium.

3. The method of obtaining titanic oxid from a substance containing it and iron oxid, which comprises heating said substance in presence of sulfid of an alkali metal until formation of iron sulfid or ferro-sodium sulfid, maintaining the resulting product in water, and meanwhile injecting sulfur dioxid gas into the bath.

4. In the treatment of a bath the solids of which comprise titanic oxid, titanate of an alkali metal, and ferro-sodium sulfids, the step which consists in adding to such bath sulfurous acid in such quantity and so diluted as to decompose and dissolve such sulfids rather than the compounds of titanium present.

LOUIS E. BARTON.

Witnesses:
B. C. POTTER,
T. C. GRAHAM.